United States Patent
Su et al.

(10) Patent No.: US 10,999,016 B2
(45) Date of Patent: May 4, 2021

(54) CONTROL INFORMATION SENDING METHOD, CONTROL INFORMATION RECEIVING METHOD, NETWORK DEVICE, AND TERMINAL DEVICE

(71) Applicant: Huawei Technologies Co., Ltd., Shenzhen (CN)

(72) Inventors: Liyan Su, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/520,750

(22) Filed: Jul. 24, 2019

(65) Prior Publication Data

US 2019/0349143 A1    Nov. 14, 2019

Related U.S. Application Data

(63) Continuation of application No. PCT/CN2018/073020, filed on Jan. 17, 2018.

(30) Foreign Application Priority Data

Jan. 25, 2017  (CN) ......................... 201710056767.X (51) Int. Cl.
  *H04L 1/18*   (2006.01)
  *H04W 72/04*   (2009.01)
  *H04W 72/14*   (2009.01)
(52) U.S. Cl.
  CPC ......... *H04L 1/1819* (2013.01); *H04W 72/042* (2013.01); *H04W 72/0466* (2013.01); *H04W 72/14* (2013.01)

(58) Field of Classification Search
  CPC .... H04L 1/1819; H04L 1/1835; H04W 72/14; H04W 72/0466; H04W 72/042
  See application file for complete search history.

(56) References Cited

U.S. PATENT DOCUMENTS

| 9,538,511 B2 * | 1/2017 | Han ..................... H04L 27/2633 |
| 2010/0008294 A1 | 1/2010 | Palanki et al. |
| 2011/0103336 A1 * | 5/2011 | Ishii .................. H04W 72/1273 370/329 |
| 2011/0239072 A1 | 9/2011 | Cai |

(Continued)

FOREIGN PATENT DOCUMENTS

| CN | 101197640 A | 6/2008 |
| CN | 101753265 A | 6/2010 |

(Continued)

*Primary Examiner* — Brian D Nguyen
(74) *Attorney, Agent, or Firm* — Slater Matsil, LLP (57) ABSTRACT

In a control information receiving method, a second device receives m control channels from a first device. Control information carried on the m control channels corresponds to a same hybrid automatic repeat request (HARQ) process and is consecutive control information of the HARQ process, control information carried on each of the m control channels includes false alarm indication information, and m is a positive integer greater than or equal to 2. The second device determines, based on a combined state of false alarm indication information carried on the m control channels, whether there is a false alarm in control information carried on at least one of the m control channels.

16 Claims, 5 Drawing Sheets

(56) References Cited

U.S. PATENT DOCUMENTS

| | | | |
|---|---|---|---|
| 2011/0246865 A1 | 10/2011 | Wen | |
| 2012/0243516 A1* | 9/2012 | Ishii | H04L 5/0053 370/336 |
| 2013/0148623 A1 | 6/2013 | Nishio et al. | |
| 2013/0288629 A1* | 10/2013 | Balraj | H04B 17/345 455/226.3 |
| 2014/0269582 A1 | 9/2014 | Guan | |
| 2014/0301231 A1* | 10/2014 | Hooli | H04L 1/0028 370/252 |
| 2015/0098380 A1 | 4/2015 | Tseng | |
| 2015/0364022 A1* | 12/2015 | Dyell | G16H 40/63 340/573.1 |
| 2015/0373675 A1* | 12/2015 | Seo | H04W 72/042 370/280 |
| 2016/0192337 A1 | 6/2016 | Wengerter et al. | |
| 2016/0302198 A1 | 10/2016 | Lee et al. | |
| 2016/0374058 A1 | 12/2016 | Dinan | |
| 2017/0013612 A1* | 1/2017 | Nayeb Nazar | H04L 5/0053 |
| 2017/0215204 A1* | 7/2017 | Sun | H04L 1/1896 |

FOREIGN PATENT DOCUMENTS

| | | |
|---|---|---|
| CN | 101754274 A | 6/2010 |
| CN | 101827377 A | 9/2010 |
| CN | 101873671 A | 10/2010 |
| CN | 102724690 A | 10/2012 |
| CN | 103139923 A | 6/2013 |
| CN | 103354484 A | 10/2013 |
| CN | 103369655 A | 10/2013 |
| CN | 105850060 A | 8/2016 |
| CN | 105992378 A | 10/2016 |

\* cited by examiner

CONTROL INFORMATION SENDING METHOD, CONTROL INFORMATION RECEIVING METHOD, NETWORK DEVICE, AND TERMINAL DEVICE

CROSS-REFERENCE TO RELATED APPLICATIONS

This application is a continuation of International Application No. PCT/CN2018/073020, filed on Jan. 17, 2018, which claims priority to Chinese Patent Application No. 201710056767.X, filed on Jan. 25, 2017. The disclosures of the aforementioned applications are hereby incorporated by reference in their entireties.

TECHNICAL FIELD

The present invention relates to the communications field, and in particular, to a control information sending method, a control information receiving method, a network device, and a terminal device.

BACKGROUND

Figure 1:
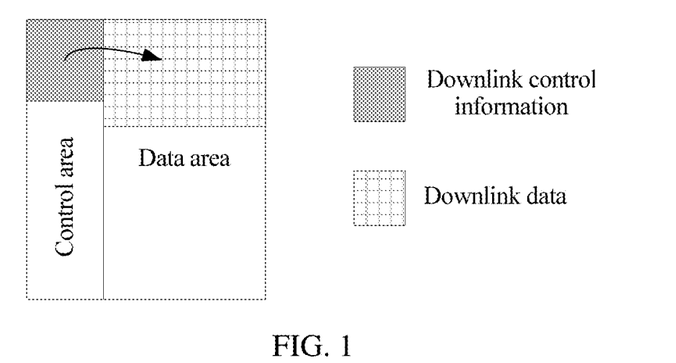
FIG. 1 is a schematic diagram of a frame structure of an existing subframe.

As communications technologies develop, a long term evolution (LTE) system is more widely applied. In the LTE system, each time of uplink or downlink transmission is performed in a unit of subframes. FIG. 1 is a schematic diagram of a frame structure of an existing subframe. Before downlink data transmission (to be specific, before a network device sends downlink data to a terminal device), the network device needs to send downlink control information (DCI) to the terminal device in the first few symbols of a subframe, to notify scheduling information of the current data transmission, including a used time-frequency resource, a used modulation and coding scheme, and the like. After obtaining the DCI through blind detection, the terminal device correctly receives and demodulates the downlink data based on the time-frequency resource, the modulation and coding scheme, and other information that are indicated in the DCI.

In an existing LTE system, a 16-bit cyclic redundancy check (CRC) code is carried in each piece of DCI. The terminal device performs a CRC check each time of blind detection. If the CRC check succeeds, the terminal device considers that the DCI is sent by the network device to the terminal device, and then obtains content of the DCI through demodulation. There is a specific false alarm (to be specific, some other signals are incorrectly considered as DCI sent by the network device to the terminal device) probability in the CRC check.

Because a false alarm may occur on the terminal device, the network device and the terminal device have different interpretations on control information. Consequently, the terminal device cannot perform an operation such as data demodulation according to an instruction of the network device.

SUMMARY

Embodiments of the present invention provide a control information sending method, a control information receiving method, a network device, and a terminal device, to reduce or even eliminate impact of a false alarm on system performance.

According to a first aspect, a control information receiving method is provided. A second device receives m control channels from a first device, where control information carried on the m control channels corresponds to a same hybrid automatic repeat request (HARQ) process and is consecutive control information of the HARQ process, control information carried on each of the m control channels includes false alarm indication information, and m is a positive integer greater than or equal to 2. The second device determines, based on a combined state of false alarm indication information carried on the m control channels, whether there is a false alarm in control information carried on at least one of the m control channels.

In this embodiment of the present invention, the second device receives the m control channels from the first device, where the control information carried on the m control channels corresponds to the same HARQ process and is consecutive control information of the HARQ process, the control information carried on each of the m control channels includes the false alarm indication information, and m is a positive integer greater than or equal to 2; and determines, based on whether the combined state of the false alarm indication information corresponding to the same HARQ process meets a preset rule, whether there is a false alarm in control information carried on at least one of the m control channels, and then eliminates impact of the false alarm on system performance.

In a possible implementation, the combined state is a first sequence; and if the first sequence is a subsequence of a preset second sequence, the second device determines that there is no false alarm in control information carried on any one of the m control channels; or if the first sequence is not a subsequence of a preset second sequence, the second device determines that there is a false alarm in control information carried on at least one of the m control channels. According to the implementation, the second device easily determines, based on the combined state, whether there is a false alarm in control information carried on at least one of the m control channels. The method is simple and easy to implement.

In a possible implementation, the preset second sequence is a cyclic sequence, a basic cyclic unit of the cyclic sequence consists of K elements, at least two of the K elements are in different states, and K is a positive integer greater than or equal to 2. According to the implementation, the preset second sequence is a cyclic sequence, so that the second device determines, through limited times of comparison, whether the first sequence is a subsequence of the second sequence. In a possible implementation, K=2 or K=3. According to the implementation, K=2 or K=3 is given, so that the second device determines, through a relatively small quantity of times, whether the first sequence is a subsequence of the second sequence.

In a possible implementation, each element may have only two different states. According to the implementation, each element may have only two different states, so that the first sequence is determined by occupying a relatively small quantity of bits or through a relatively small quantity of detection times. This reduces overheads required by DCI for carrying false alarm indication information.

In a possible implementation, the false alarm indication information is a scrambling code corresponding to the control information carried on the control channel; and if control information carried on any two continuous control channels of the m control channels corresponds to different scrambling codes, the second device determines that there is no false alarm in control information carried on any one of the m control channels; or if control information carried on two continuous control channels of the m control channels corresponds to a same scrambling code, the second device determines that there is a false alarm in control information carried on at least one of the two continuous control channels. According to the implementation, that the false alarm indication information is a scrambling code corresponding to the control information carried on the control channel is an implicit indication solution in which no additional bit needs to be occupied compared with an explicit indication solution. This reduces overheads required by the second device for receiving the false alarm indication information carried in the DCI.

In a possible implementation, the second device is a terminal device, the first device is a network device, and the control information is downlink assignment control information or uplink grant control information; or the second device is a network device, the first device is a terminal device, and the control information is terminal control information. According to the implementation, both the network device and the terminal device can identify whether a false alarm occurs in received control information.

According to a second aspect, a control information sending method is provided. A first device sends n control channels to a second device, where control information carried on the n control channels corresponds to a same HARQ process and is consecutive control information of the HARQ process, control information carried on each of the n control channels includes false alarm indication information, n is a positive integer greater than or equal to 2, and a combined state of false alarm indication information carried on the n control channels meets a preset rule.

In this embodiment of the present invention, the first device adds the false alarm indication information to the control information, and enables the combined state of the false alarm indication information corresponding to the same HARQ process to meet the preset rule, so that the second device, namely, a control information receiving device, can determine, based on the combined state of the false alarm indication information, whether a false alarm occurs, and then eliminate impact of the false alarm on system performance.

In a possible implementation, the combined state is a first sequence, and the first sequence is a subsequence of a preset second sequence.

In a possible implementation, the preset second sequence is a cyclic sequence, a basic cyclic unit of the cyclic sequence consists of K elements, at least two of the K elements are in different states, and K is a positive integer greater than or equal to 2. According to the implementation, the preset second sequence is a cyclic sequence, so that the second device can determine, through limited times of comparison, whether the first sequence is a subsequence of the second sequence.

In a possible implementation, K=2 or K=3. According to the implementation, K=2 or K=3, so that the second device can determine, through a relatively small quantity of times, whether the first sequence is a subsequence of the second sequence.

In a possible implementation, each element may have only two different states. According to the implementation, each element may have only two different states, so that the first sequence is determined by occupying a relatively small quantity of bits or through a relatively small quantity of detection times. This reduces overheads required by the first device for sending false alarm indication information carried in DCI.

In a possible implementation, the false alarm indication information is a scrambling code corresponding to the control information carried on the control channel, and control information carried on two continuous control channels of the n control channels corresponds to different scrambling codes. According to the implementation, that the false alarm indication information is a scrambling code corresponding to the control information carried on the control channel is an implicit indication solution in which no additional bit needs to be occupied compared with an explicit indication solution. This reduces overheads required by the DCI for carrying the false alarm indication information.

In a possible implementation, the first device is a terminal device, the second device is a network device, and the control information is terminal control information; or the first device is a network device, the second device is a terminal device, and the control information is downlink assignment control information or uplink grant control information. According to the implementation, both the network device and the terminal device can send control information including false alarm indication information, so that a control information receiving device can identify whether a false alarm occurs in the received control information.

According to a third aspect, a buffer cleaning method is provided. After receiving first control information for scheduling downlink data or receiving downlink data scheduled by using first control information, if a terminal device does not obtain, through detection within a buffer cleaning time interval, second control information for instructing to retransmit the downlink data, the terminal device cleans a buffer occupied by the downlink data.

In this embodiment of the present invention, the terminal device regularly cleans a buffer, to eliminate impact of a false alarm.

In a possible implementation, the terminal device receives higher layer signaling, where the higher layer signaling includes the buffer cleaning time interval. According to the implementation, the higher layer signaling does not cause physical layer signaling overheads, and the buffer cleaning time interval can be flexibly configured.

In a possible implementation, the first control information includes the buffer cleaning time interval.

In a possible implementation, the buffer cleaning time interval is predefined. According to the implementation, the predefined buffer cleaning time interval does not cause any signaling overheads.

According to a fourth aspect, a buffer cleaning method is provided. A network device sends higher layer signaling, where the higher layer signaling includes a buffer cleaning time interval.

In this embodiment of the present invention, the network device sends the buffer cleaning time interval to a terminal device, so that the terminal device regularly cleans a buffer, to eliminate impact of a false alarm.

According to another aspect, an embodiment of the present invention provides a terminal device. The terminal device can implement the function performed by the terminal device in the method design in the first, second, or third aspect. The function may be implemented by hardware, or may be implemented by hardware by executing corresponding software. The hardware or software includes one or more modules corresponding to the function.

In a possible design, a structure of the terminal device includes a processor and a communications interface. The processor is configured to support the terminal device in performing the corresponding function in the method in the first, second, or third aspect. The communications interface is configured to support communication between the terminal device and a network device or another network element. The terminal device may further include a memory. The memory is configured to be coupled to the processor, and the memory stores a program instruction and data that are necessary for the terminal device.

According to still another aspect, an embodiment of the present invention provides a network device. The network device can implement the function performed by the network device in the method design in the first, second, or fourth aspect. The function may be implemented by hardware, or may be implemented by hardware by executing corresponding software. The hardware or software includes one or more modules corresponding to the function.

In a possible design, a structure of the network device includes a processor and a communications interface. The processor is configured to support the network device in performing corresponding functions in the foregoing methods. The communications interface is configured to support communication between the network device and a terminal device or another network element. The network device may further include a memory. The memory is configured to be coupled to the processor, and the memory stores a program instruction and data that are necessary for the network device.

According to still another aspect, an embodiment of the present invention provides a communications system. The system includes the network device and the terminal device in the foregoing aspects.

According to yet another aspect, an embodiment of the present invention provides a computer storage medium, configured to store a computer software instruction used by the foregoing terminal device. The computer software instruction includes a program designed for performing the method in the first, second, or third aspect.

According to yet another aspect, an embodiment of the present invention provides a computer storage medium, configured to store a computer software instruction used by the foregoing network device. The computer software instruction includes a program designed for performing the method in the first, second, or fourth aspect.

According to yet another aspect, an embodiment of the present invention provides a computer program product. The computer program product includes an instruction. When the program is executed by a computer, the instruction enables the computer to perform the functions performed by the terminal device in the foregoing method designs.

According to yet another aspect, an embodiment of the present invention provides a computer program product. The computer program product includes an instruction. When the program is executed by a computer, the instruction enables the computer to perform the functions performed by the network device in the foregoing method designs.

DETAILED DESCRIPTION OF ILLUSTRATIVE EMBODIMENTS

To make the objectives, technical solutions, and advantages of the embodiments of the present invention clearer, the following describes the technical solutions of the embodiments of the present invention with reference to the accompanying drawings and the embodiments in the embodiments of the present invention.

Usually, after demodulating downlink data, a terminal device checks whether the downlink data is correct. If the check succeeds, the terminal device sends an acknowledgement (ACK) to a network device. If the check fails, the terminal device sends a negative acknowledgement (NACK) to the network device. Both the acknowledgement and the negative acknowledgement are carried on a physical uplink control channel (PUCCH) that the terminal device agrees on with the network device in advance.

After receiving the NACK, the network device usually arranges retransmission for the terminal device. After receiving retransmitted data, the terminal device combines previous data with the retransmitted data and performs demodulation again. However, in some special cases, the data transmission is completely abandoned, and new data is transmitted. To indicate, to the terminal device, whether data transmission is initial transmission or retransmission, DCI sent by the network device includes a new data indicator (NDI). If a current NDI is the same as a previous NDI, it indicates that current transmission is retransmission. If a current NDI is different from a previous NDI (also referred to as to toggling), it indicates that current transmission is initial transmission of new data. Such a structure may continue to be used in a new radio (NR) system of a 5th-generation mobile wireless technology.

Ultra-reliable and low latency communications (URLLC) is a novel service type introduced into the NR system of the 5th-generation mobile wireless technology. For this type of service, transmission needs to be completed within 1 ms (low latency), and a success probability needs to reach 99.999% (in other words, an error rate is 10E-5, with ultra-reliability). It is found through research that, in the NR system, if the network device continues to use existing DCI, the ultra-reliability requirement of the URLLC service cannot be met. Therefore, new DCI urgently needs to be designed.

In addition, in the NR system, to further reduce an uplink transmission latency, a manner in which the network device grants the terminal device permission to perform uplink transmission may change. The network device assigns a resource occupied for uplink transmission to the terminal device in advance. When the terminal device needs to send uplink data, similar to downlink data sending in an LTE system, the terminal device sequentially transmits uplink control information and the uplink data within a same transmission time interval. The uplink control information is control information sent by the terminal device to the network device, and is used to notify the network device of some information required for demodulating the uplink data, such as a modulation and coding scheme. Therefore, to be distinguished from uplink control information in a conventional LTE system, the uplink control information in the NR system is referred to as terminal control information (for example, User Equipment Control Information, UECI) in the embodiments of the present invention. The UECI includes information such as a user equipment (UE) number, a modulation and coding scheme (MCS), and an NDI. In this way, UE initiates uplink transmission, which replaces a series of redundant steps in LTE: UE sends a request, an evolved NodeB (eNB) grants permission, and then the UE sends uplink data. This helps reduce a transmission latency.

The embodiments of the present invention provide a control information sending method and a control information receiving method. According to the methods, a control information receiving device can detect that a false alarm occurs in control information. The methods are applicable to both a case in which a network device sends control information to a terminal device and a case in which the terminal device sends control information to the network device. When the network device sends control information to the terminal device, the control information may be referred to as DCI, for example, downlink (DL) assignment control information or uplink (UL) grant control information. When the terminal device sends control information to the network device, the control information may be referred to as UECI or terminal control information.

The following provides specific application scenarios of the embodiments of the present invention by way of example. The following scenarios are merely for an illustration purpose, and are not intended to limit specific application scenarios of the embodiments of the present invention.

A scenario 1 is a transmission scenario of downlink assignment control information, and a scenario 2 is a transmission scenario of uplink grant control information. In the scenario 1 and the scenario 2, a DCI false alarm causes a data transmission failure (in LTE, a maximum of four times of retransmission are allowed, but the network device cannot complete data transmission within four times of retransmission). Table 1 is a scenario parameter correspondence table of impact of a DCI false alarm on system performance.

TABLE 1

| | NDI | Subframe 0 | Subframe 1 (false alarm) | Subframe 2 |
|---|---|---|---|---|
| Scenario 1 (downlink assignment) | Network device | 0 | — | 1 |
| | Terminal device | 0 | 1 | 1 |
| Scenario 2 (uplink grant) | Network device | 0 | — | 0 |
| | Terminal device | 0 | 1 | 0 |

It can be learned from Table 1 that, in the scenario 1, the network device completes transmission of old data in the subframe 0, and transmits new data in the subframe 2 (in this case, the NDI changes, and this is denoted by 0 and 1 respectively in the table). A false alarm occurs on the terminal device in the subframe 1, and a detected NDI is the same as an NDI detected in the subframe 2.

Figure 2:
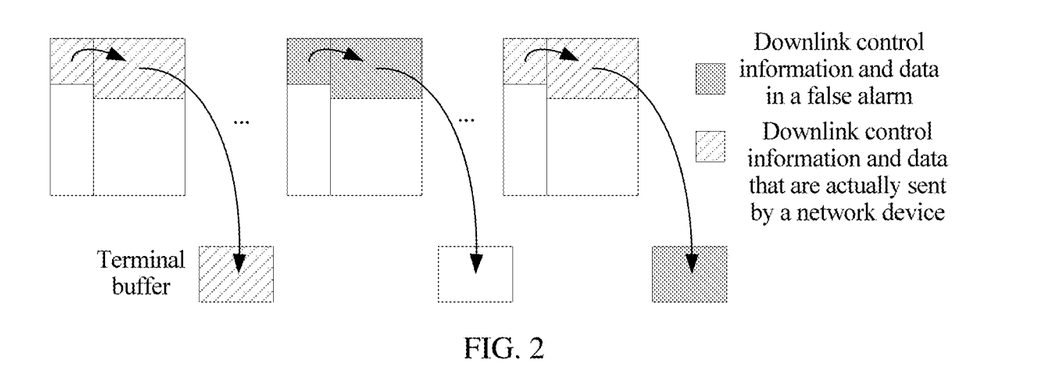
FIG. 2 is a schematic diagram of impact of a DCI false alarm on retransmission in a scenario 1.

FIG. 2 is a schematic diagram of impact of a DCI false alarm on retransmission in the scenario 1. In the scenario 1, the terminal device considers, based on the NDI, that data is initially transmitted in the subframe 1, and stores the corresponding data in a buffer of the terminal device for demodulation. Because the false alarm actually occurs in the subframe 1, this part of data inevitably cannot be correctly demodulated, and the terminal device feeds back a NACK. In the subframe 1, the network device does not actually send data, and therefore does not detect ACK or NACK information sent by the terminal device, and continues to send DCI and data in the subframe 2 according to an original plan. The terminal device receives the real DCI in the subframe 2. By detecting the NDI, the terminal device considers that the data in the subframe 2 is retransmitted data of the data in the subframe 1, combines the data in the subframe 2 and the data in the subframe 1, and then continues to detect whether combined data is correct. It is usually considered that data cannot be correctly demodulated provided that error information is mixed in the buffer. In other words, the terminal device cannot obtain correct data regardless of a quantity of subsequent retransmission times.

In the scenario 2, the network device grants, in a subframe 0, the terminal device permission to upload data (perform either initial transmission or retransmission), and grants, in the subframe 2, the terminal device permission to perform data retransmission (in this case, the NDI does not change, and this is denoted by 0 in the table). A false alarm occurs on the terminal device in the subframe 1, and a detected NDI is different from an NDI detected in the subframe 0 and an NDI detected in the subframe 2.

In the scenario 2, the network device expects that the terminal device transmits a data packet P0 in the subframe 0, and retransmits the data packet P0 in the subframe 2 (this means that the network device does not correctly receive the uplink data P0 in the subframe 0). However, by identifying the NDI, the terminal device transmits the data packet P0 in the subframe 0, transmits a new data packet P1 in the subframe 1, and transmits a new data packet P2 in the subframe 2. Consequently, none of P0, P1, and P2 can be correctly received by the network device.

Scenario 3: In an NR system, the terminal device initiates uplink transmission in a form of UECI. In this case, because the scenario 3 is similar to the scenario 2, details are not described herein.

First, it should be noted that, usually, the control information sending method and the control information receiving method are not designed for a URLLC service. Therefore, a serious problem is caused when the methods are applied to the high reliability URLLC service. For example, 16-bit CRC code is used to support the terminal device in blind detection, so that there is a false alarm probability of $2^{-16} \approx 1.5 \times 10^{-5}$ each time the terminal device blindly detects DCI. Although each false alarm does not necessarily cause a transmission failure, in use of some system parameters, an error rate of 10E-5 of a URLLC system cannot be ensured due to such a false alarm probability.

Because a false alarm may occur on the terminal device, the network device and the terminal device have different interpretations on control information. Consequently, the terminal device cannot perform an operation such as data demodulation according to an instruction of the network device. In the embodiments of the present invention, a capability of learning of a false alarm is provided for the terminal device or the network device, or the false alarm probability is reduced, to eliminate impact of a false alarm on system performance.

The embodiments of the present invention may be based on various types of wireless communications systems, for example, a 4.5th-generation (4.5G) communications system and a 5th-generation (5G) communications system.

To help understand the embodiments of the present invention, the following first describes basic concepts in the embodiments of the present invention. An LTE system is used as an example for description. However, this does not mean that the embodiments of the present invention are applicable only to the LTE system. Actually, any wireless communications system that transmits data through scheduling can use the solutions provided in the embodiments of the present invention.

In terms of a retransmission protocol, a structure with a multi-stop-and-wait protocol is used in the LTE system. To be specific, after sending a block of data, a network device stops a sending action and waits for an ACK or a NACK from a receiver, and then determines whether to perform retransmission. Exactly due to this simple solution, only by feeding back 1 bit, a terminal device can indicate whether the block of data is correctly transmitted (ACK or NACK). However, because the network device needs to stop and wait for an ACK or a NACK after each time of transmission, transmission efficiency is very low. Therefore, in LTE, a plurality of stop-and-wait protocols are used in parallel, and a process number (there are eight process numbers in total for frequency division duplex (FDD), and there are 16 process numbers in total for time division duplex (TDD)) is set in DCI, to indicate a corresponding stop-and-wait protocol. In this way, when waiting for an acknowledgement for a process, the network device can use another process to transmit data, to implement equivalent continuous transmission.

Figure 3:
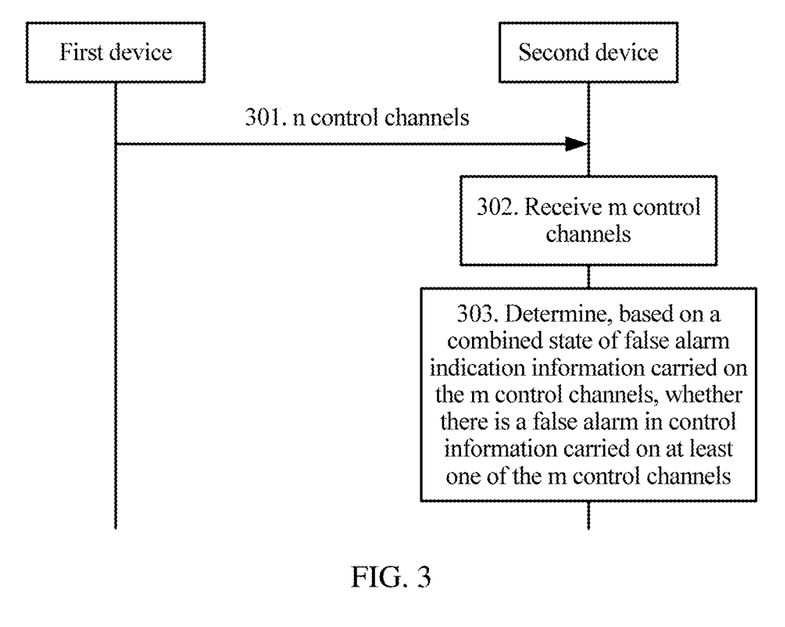
FIG. 3 is a schematic communication diagram of a control information sending method and a control information receiving method according to an embodiment of the present invention.

FIG. 3 is a schematic communication diagram of a control information sending method and a control information receiving method according to an embodiment of the present invention. The method may be based on the foregoing specific application scenarios. Referring to FIG. 3, the method includes the following steps.

Step 301: A first device sends n control channels to a second device.

In this embodiment of the present invention, control information carried on the n control channels corresponds to a same hybrid automatic repeat request (HARQ) process and is consecutive control information of the HARQ process.

In an asynchronous HARQ system, the first device and the second device determine, based on HARQ process numbers carried on control channels, whether control information corresponds to a same HARQ process. In a synchronous HARQ system, the first device and the second device determine, based on time interval numbers, whether control information corresponds to a same HARQ process. The "consecutive" means that when the first device sends or the second device receives the n pieces of control information corresponding to the same HARQ process, the first device does not send and/or the second device does not receive other control information corresponding to the HARQ process.

In this embodiment of the present invention, control information carried on each of the n control channels includes false alarm indication information, the false alarm indication information may be explicitly or implicitly indicated, and n is a positive integer greater than or equal to 2. For example, the false alarm indication information is explicitly indicated and occupies 1 bit in the control information, and the false alarm indication information is 0 or 1.

In this embodiment of the present invention, a combined state of false alarm indication information carried on the n control channels sent by the first device meets a preset rule. The preset rule may be predefined, or may be notified by using higher layer signaling.

In an example, the combined state is a first sequence. For example, when the false alarm indication information occupies 1 bit in the control information, the combined state is a sequence obtained by combining n pieces of i-bit false alarm indication information, where the sequence is also referred to as a first sequence. The preset rule is that the first sequence is a subsequence of a preset second sequence.

In an example, the preset second sequence is a cyclic sequence, a basic cyclic unit of the cyclic sequence consists of K elements, at least two of the K elements are in different states, and K is a positive integer greater than or equal to 2.

In an example, K=2 or K=3.

In an example, each element may have only two different states.

For example, the second sequence is a cyclic sequence such as "010101 . . . " or "101010 . . . ", and a basic cyclic unit of the cyclic sequence is "01" or "10", including K=2 elements. Alternatively, the second sequence is a cyclic sequence such as "001001 . . . ", "010010 . . . ", or "100100 . . . ", and a basic cyclic unit of the cyclic sequence is "001", "010", or "100", including K=3 elements.

In an example, the false alarm indication information is a scrambling code corresponding to the control information carried on the control channel, and control information carried on two continuous control channels of the n control channels corresponds to different scrambling codes.

In an example, the first device is a terminal device, the second device is a network device, and the control information is terminal control information; or the first device is a network device, the second device is a terminal device, and the control information is downlink assignment control information or uplink grant control information.

Step 302: The second device receives m control channels from the first device.

Control information carried on the m control channels corresponds to a same HARQ process and is consecutive control information of the HARQ process, control information carried on each of the m control channels includes false alarm indication information, m is a positive integer greater than or equal to 2, and m is usually greater than or equal to n due to a false alarm. In an example, the false alarm indication information is explicitly indicated and occupies 1 bit in the control information, the false alarm indication information is 0 or 1, and a combined state of the m pieces of i-bit false alarm indication information constitutes a third sequence.

Step 303: The second device determines, based on a combined state of false alarm indication information carried on the m control channels, whether there is a false alarm in control information carried on at least one of the m control channels.

In an example, the combined state is a third sequence; and the preset rule is as follows: If the third sequence is a subsequence of a preset second sequence, the second device determines that there is no false alarm in control information carried on any one of the m control channels; or if the third sequence is not a subsequence of a preset second sequence, the second device determines that there is a false alarm in control information carried on at least one of the m control channels. For example, the second sequence is a cyclic sequence such as "010101 . . . " or "101010 . . . ", and the third sequence is "010101". Because the third sequence is a subsequence of the second sequence, the second device determines that there is no false alarm in control information carried on any one of the m control channels. For another example, the second sequence is a cyclic sequence such as "010101 . . . " or "101010 . . . ", and the third sequence is "01101". Because the third sequence is not a subsequence of the second sequence, the second device determines that there is a false alarm in control information carried on at least one of the m control channels.

In an example, the preset second sequence is a cyclic sequence, a basic cyclic unit of the cyclic sequence consists of K elements, at least two of the K elements are in different states, and K is a positive integer greater than or equal to 2.

In an example, K=2 or K=3.

In an example, each element may have only two different states.

In an example, the false alarm indication information is a scrambling code corresponding to the control information carried on the control channel; and if control information carried on any two continuous control channels of the m control channels corresponds to different scrambling codes, the second device determines that there is no false alarm in control information carried on any one of the m control channels; or if control information carried on two continuous control channels of the m control channels corresponds to a same scrambling code, the second device determines that there is a false alarm in control information carried on at least one of the two continuous control channels.

In this embodiment of the present invention, the false alarm indication information is added to the control information, and the combined state of the false alarm indication information corresponding to the same HARQ process is enabled to meet the preset rule, so that a control information receiving device can determine, based on the combined state of the false alarm indication information, whether a false alarm occurs, and then eliminate impact of the false alarm on system performance.

In an example, the false alarm indication information is predefined M-bit information. Optionally, M=1, and the false alarm indication information is predefined as a clock signal. To be specific, for a specific process number, each piece of false alarm indication information is different from a previous piece of false alarm indication information transmitted with the process number (in other words, toggling occurs). By detecting the false alarm indication information and the process number, the terminal device determines, based on at least one piece of false alarm indication information previously obtained through detection based on a same process number and a current piece of false alarm indication information obtained through detection, whether a false alarm occurs in DCI.

A scenario 1 is used as an example, DCI (including a false alarm) received by the terminal device is shown in the following Table 2.

TABLE 2

| Scenario 1 | | Subframe 0 | Subframe 1 (false alarm) | | | | Subframe 2 |
|---|---|---|---|---|---|---|---|
| Network device | NDI | 0 | — | | | | 1 |
| | False alarm indication information | 0 | | | | | 1 |
| Terminal device | NDI | 0 | 0 | 1 | 0 | 1 | 1 |
| | False alarm indication information | 0 | 0 | 0 | 1 | 1 | 1 |

If false alarm indication information received by the terminal device in a subframe does not toggle, the terminal device can learn that a false alarm inevitably occurs in either the subframe or a previous subframe in which DCI is received.

In a terminal implementation solution, the terminal device may not demodulate the two subframes in which a false alarm may occur, and feeds back NACKs on both corresponding PUCCH resources and waits for next retransmission performed by the network device.

In this embodiment of the present invention, a capability of learning of a false alarm is provided for the terminal device, to eliminate impact of a false alarm on system performance.

An embodiment of the present invention further provides a buffer cleaning method. After receiving first control information for scheduling downlink data or receiving downlink data scheduled by using first control information, if a terminal device does not obtain, through detection within a buffer cleaning time interval, second control information for instructing to retransmit the downlink data, the terminal device cleans a buffer occupied by the downlink data.

In an example, the terminal device receives higher layer signaling from a network device, where the higher layer signaling includes the buffer cleaning time interval.

In another example, the first control information includes the buffer cleaning time interval.

Figure 4:
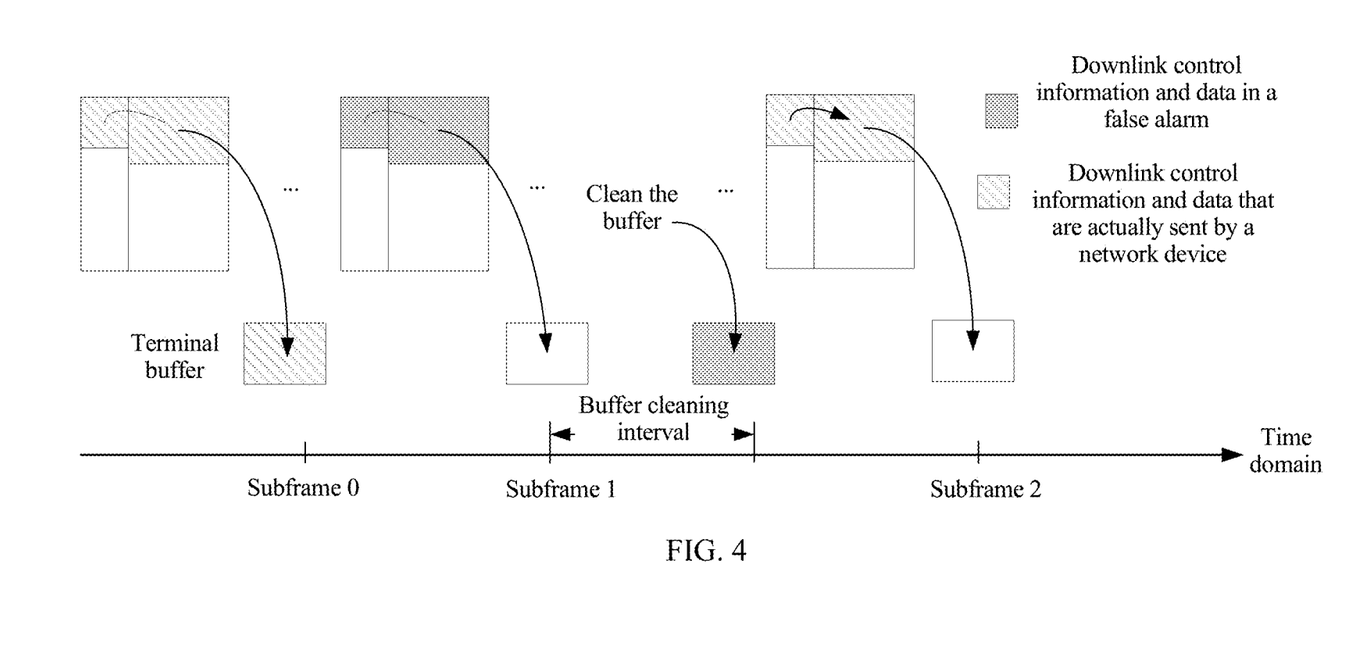
FIG. 4 is a schematic diagram of cleaning a buffer by a terminal device according to an embodiment of the present invention.

FIG. 4 is a schematic diagram of cleaning a buffer by a terminal device according to an embodiment of the present invention. For a process number, if after the terminal device receives DCI for indicating downlink transmission and data in the downlink transmission is incorrectly demodulated, the terminal device still does not obtain, through detection after a buffer cleaning interval, DCI for indicating retransmission, the terminal device cleans a buffer occupied by the downlink transmission.

In this embodiment of the present invention, the buffer is cleaned to eliminate impact of a false alarm on system performance.

The solutions of the embodiments of the present invention are mainly described above from a perspective of interaction between network elements. It may be understood that, to implement the foregoing functions, the network elements such as the network device and the terminal device include corresponding hardware structures and/or software modules for performing the functions. A person skilled in the art should easily be aware that, example units and algorithm steps described with reference to the embodiments disclosed in this specification can be implemented in the present invention in a form of hardware or a combination of hardware and computer software. Whether a function is performed by hardware or by hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, the network device, the terminal device, and the like may be divided into function modules based on the foregoing method examples. For example, each function module may be divided corresponding to each function, or two or more functions may be integrated into one processing module. The integrated module may be implemented in a form of hardware, or may be implemented in a form of a software function module. It should be noted that, in the embodiments of the present invention, module division is an example, and is merely logical function division. During actual implementation, there may be another division manner.

Figure 5:
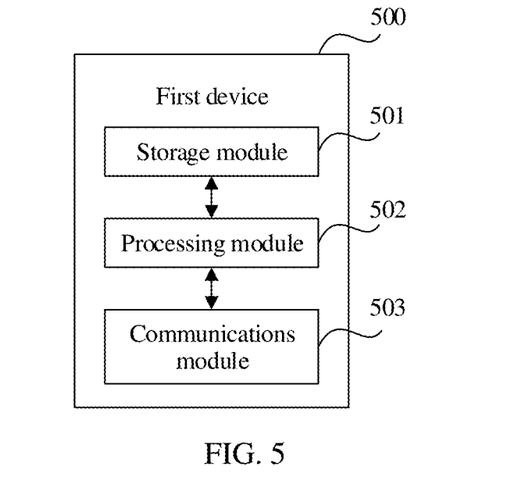
FIG. 5 is a schematic structural diagram of a first device according to an embodiment of the present invention.

When an integrated module is used, FIG. 5 is a possible schematic structural diagram of the first device in the foregoing embodiments. The first device may be a network device or a terminal device. A first device 500 includes a processing module 502 and a communications module 503. The processing module 502 is configured to control and manage actions of the first device. For example, the processing module 502 is configured to support the first device in performing the process 301 in FIG. 3, and/or is configured to perform another process of the technology described in this specification. The communications unit 503 is configured to support communication between the first device and another network entity, for example, communication between the first device and a second device. For example, the communications module 503 is configured to support the first device in performing the process 301 in FIG. 3, and/or is configured to perform another process of the technology described in this specification. The first device may further include a storage module 501, configured to store program code and data of the first device.

The processing module 502 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module 502 may implement or execute various example logical blocks, modules, and circuits described with reference to content disclosed in the present invention. Alternatively, the processor may be a combination implementing a computing function, for example, a combination including one or more microprocessors, or a combination of a DSP and a microprocessor. The communications module 503 may be a communications interface, a transceiver, a transceiver circuit, or the like. The communications interface is a general term, and may include one or more interfaces. The storage module 501 may be a memory.

Figure 6:
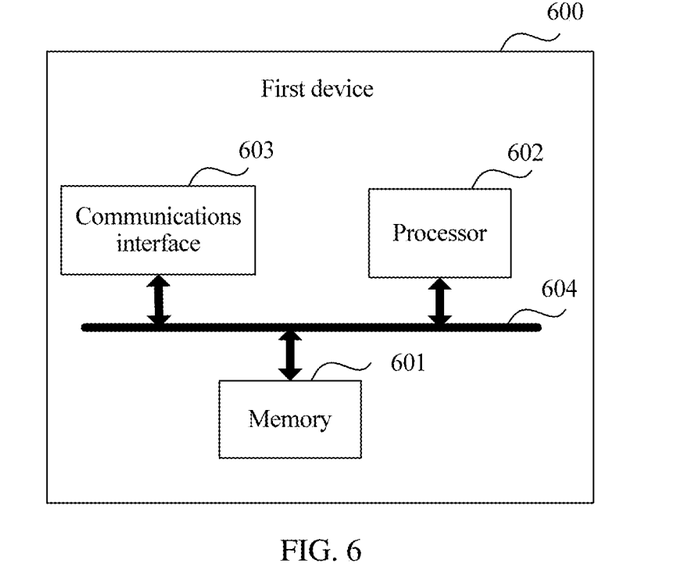
FIG. 6 is a schematic structural diagram of another first device according to an embodiment of the present invention.

When the processing module 502 is a processor, the communications module 503 is a communications interface, and the storage module 501 is a memory, the first device in this embodiment of the present invention may be a first device 600 shown in FIG. 6.

Referring to FIG. 6, the first device 600 includes a processor 602, a communications interface 603, and a memory 601. Optionally, the first device 600 may further include a bus 604. The communications interface 603, the processor 602, and the memory 601 may be connected to each other by using the bus 604. The bus 604 may be a peripheral component interconnect (PCI for short) bus, an extended industry standard architecture (EISA for short) bus, or the like. The bus 604 may be classified as an address bus, a data bus, a control bus, or the like. For ease of representation, only one thick line is used to represent the bus in FIG. 6, but this does not mean that there is only one bus or only one type of bus.

Figure 7:
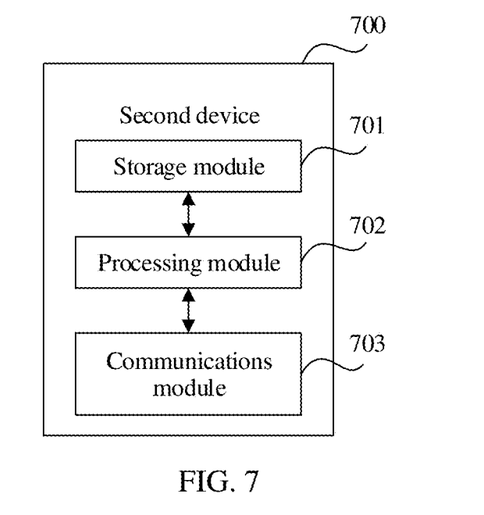
FIG. 7 is a schematic structural diagram of a second device according to an embodiment of the present invention.

When an integrated module is used, FIG. 7 is a possible schematic structural diagram of the second device in the foregoing embodiments. The second device may be a network device or a terminal device. A second device 700 includes a processing module 702 and a communications module 703. The processing module 702 is configured to control and manage actions of the second device. For example, the processing module 702 is configured to support the second device in performing the processes 302 and 303 in FIG. 3, and/or is configured to perform another process of the technology described in this specification. The communications unit 703 is configured to support communication between the second device and another network entity, for example, communication between the second device and a first device. For example, the communications module 703 is configured to support the second device in performing the process 302 in FIG. 3, and/or is configured to perform another process of the technology described in this specification. The second device may further include a storage module 701, configured to store program code and data of the second device.

The processing module 702 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module 702 may implement or execute various example logical blocks, modules, and circuits described with reference to content disclosed in the present invention. Alternatively, the processor may be a combination implementing a computing function, for example, a combination including one or more microprocessors, or a combination of a DSP and a microprocessor. The communications module 703 may be a communications interface, a transceiver, a transceiver circuit, or the like. The communications interface is a general term, and may include one or more interfaces. The storage module 701 may be a memory.

Figure 8:
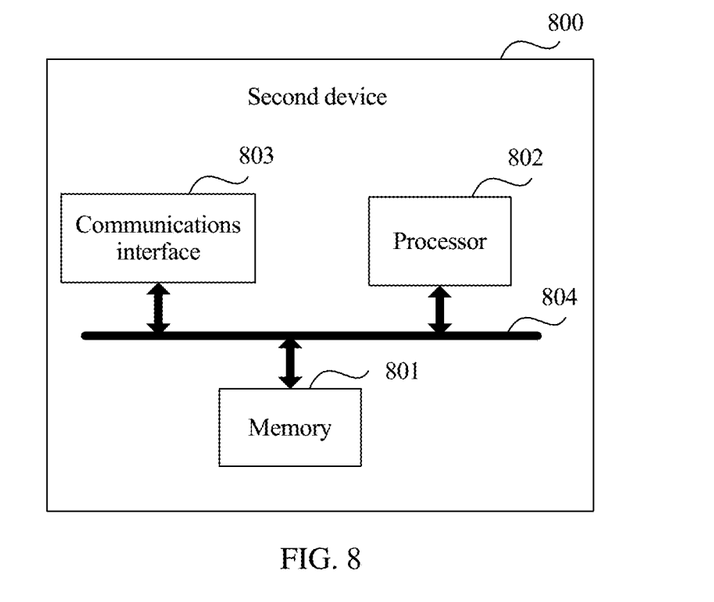
FIG. 8 is a schematic structural diagram of another second device according to an embodiment of the present invention.

When the processing module 702 is a processor, the communications module 703 is a communications interface, and the storage module 701 is a memory, the second device in this embodiment of the present invention may be a second device 800 shown in FIG. 8.

Referring to FIG. 8, the second device 800 includes a processor 802, a communications interface 803, and a memory 801. Optionally, the second device 800 may further include a bus 804. The communications interface 803, the processor 802, and the memory 801 may be connected to each other by using the bus 804. The bus 804 may be a peripheral component interconnect (PCI for short) bus, an extended industry standard architecture (EISA for short) bus, or the like. The bus 804 may be classified as an address bus, a data bus, a control bus, or the like. For ease of representation, only one thick line is used to represent the bus in FIG. 8, but this does not mean that there is only one bus or only one type of bus.

Method or algorithm steps described with reference to the content disclosed in the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. An example storage medium is coupled to a processor, so that the processor can read information from the storage medium and can write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, the functions described in the present invention may be implemented by hardware, software, firmware, or any combination thereof. When the functions are implemented by software, the functions may be stored in a computer readable medium or transmitted as one or more instructions or code in the computer readable medium. The computer readable medium includes a computer storage medium and a communications medium. The communications medium includes any medium that enables a computer program to be transmitted from one place to another place. The storage medium may be any available medium accessible to a general-purpose or dedicated computer.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, improvement, or the like made based on the technical solutions of the present invention shall fall within the protection scope of the present invention.

What is claimed is:

1. A method, comprising:
   receiving m control channels from a first device, wherein each control channel of the m control channels carries respective control information, the respective control information carried on the m control channels corresponds to a same hybrid automatic repeat request (HARQ) process and is consecutive control information of the HARQ process, the respective control information carried on each of the m control channels comprises respective false alarm indication information, and m is a positive integer greater than or equal to 2;
   combining the respective false alarm indication information carried on each of the m control channels to form a first sequence; and
   determining, based on the first sequence, whether there is a false alarm in the respective control information carried on at least one of the m control channels.

2. The method according to claim 1, wherein determining whether there is a false alarm in the respective control information carried on at least one of the m control channels comprises:
   when the first sequence is a subsequence of a preset second sequence, determining that there is no false alarm in the respective control information carried on any of the m control channels; or
   when the first sequence is not a subsequence of the preset second sequence, determining that there is a false alarm in the respective control information carried on at least one of the m control channels.

3. The method according to claim 2, wherein:
   the preset second sequence is a cyclic sequence; and
   a basic cyclic unit of the cyclic sequence consists of K elements, at least two of the K elements are in different states, and K is a positive integer greater than or equal to 2.

4. The method according to claim 3, wherein K=2 or K=3.

5. The method according to claim 3, wherein each element of the K elements has only two different states.

6. The method according to claim 1, wherein:
   the respective control information carried on each of the m control channels is downlink assignment control information or uplink grant control information; or
   the respective control information carried on each of the m control channels is terminal control information.

7. A method, comprising:
   sending n control channels to a second device, wherein each control channel of the n control channels carries respective control information, the respective control information carried on each of the n control channels corresponds to a same hybrid automatic repeat request (HARQ) process and is consecutive control information of the HARQ process, the respective control information carried on each of the n control channels comprises respective false alarm indication information, n is a positive integer greater than or equal to 2, and a combined state of the respective false alarm indication information carried on each of the n control channels meets a preset rule, and wherein the combined state is a first sequence, and the first sequence is a subsequence of a preset second sequence.

8. The method according to claim 7, wherein:
   the preset second sequence is a cyclic sequence; and
   a basic cyclic unit of the cyclic sequence consists of K elements, at least two of the K elements are in different states, and K is a positive integer greater than or equal to 2.

9. The method according to claim 8, wherein K=2 or K=3.

10. The method according to claim 8, wherein each element of the K elements has only two different states.

11. The method according to claim 7, wherein:
    the respective control information carried on each of the n control channels is terminal control information; or
    the respective control information carried on each of the n control channels is downlink assignment control information or uplink grant control information.

12. An apparatus, comprising:
    a non-transitory storage medium, configured to store executable instructions; and
    a processor;
    wherein the executable instructions, when executed by the processor, cause the apparatus to:
    receive m control channels from a first device, wherein each control channel of the m control channels carries respective control information, the respective control information carried on each control channel of the m control channels corresponds to a same hybrid automatic repeat request (HARQ) process and is consecutive control information of the HARQ process, the respective control information carried on each of the m control channels comprises respective false alarm indication information, and m is a positive integer greater than or equal to 2;
    combine the respective false alarm indication information carried on each of the m control channels to form a first sequence; and
    determine, based on the first sequence, whether there is a false alarm in the respective control information carried on at least one of the m control channels.

13. The apparatus according to claim 12, wherein and determining whether there is a false alarm in the respective control information carried on at least one of the m control channels comprises:
    when the first sequence is a subsequence of a preset second sequence, determining that there is no false alarm in the respective control information carried on of the m control channels; or
    when the first sequence is not a subsequence of a preset second sequence, determining that there is a false alarm in the respective control information carried on at least one of the m control channels.

14. The apparatus according to claim 13, wherein:
the preset second sequence is a cyclic sequence; and
a basic cyclic unit of the cyclic sequence consists of K elements, at least two of the K elements are in different states, and K is a positive integer greater than or equal to 2.

15. An apparatus, comprising:
a non-transitory storage medium storing executable instructions; and
a processor;
wherein the executable instructions, when executed by the processor, cause the apparatus to:
send n control channels to a second device, wherein each control channel of the n control channels carries respective control information, the respective control information carried on each of the n control channels corresponds to a same hybrid automatic repeat request (HARQ) process and is consecutive control information of the HARQ process, the respective control information carried on each of the n control channels comprises respective false alarm indication information, n is a positive integer greater than or equal to 2, and a combined state of the respective false alarm indication information carried on each of the n control channels meets a preset rule, and wherein the combined state is a first sequence, and the first sequence is a subsequence of a preset second sequence.

16. The apparatus according to claim 15, wherein:
the preset second sequence is a cyclic sequence; and
a basic cyclic unit of the cyclic sequence consists of K elements, at least two of the K elements are in different states, and K is a positive integer greater than or equal to 2.

* * * * *